United States Patent
Guo et al.

(10) Patent No.: US 7,415,427 B2
(45) Date of Patent: Aug. 19, 2008

(54) METHOD, COMPUTER NETWORK, AND SIGNAL-BEARING MEDIUM FOR PERFORMING A NEGOTIATION UTILIZING PARETO-OPTIMIZATION

(75) Inventors: Xin Guo, Mt. Kisco, NY (US); Quoc-Bao Nguyen, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 1456 days.

(21) Appl. No.: 10/132,289

(22) Filed: Apr. 26, 2002

(65) Prior Publication Data

US 2003/0204466 A1 Oct. 30, 2003

(51) Int. Cl.
G06Q 30/00 (2006.01)
G06F 17/30 (2006.01)
(52) U.S. Cl. .............................. 705/26; 705/27; 705/37
(58) Field of Classification Search ............. 705/26–27, 705/37
See application file for complete search history.

(56) References Cited

U.S. PATENT DOCUMENTS

| | | | | |
|---|---|---|---|---|
| 6,647,373 | B1* | 11/2003 | Carlton-Foss | 705/37 |
| 2001/0021923 | A1* | 9/2001 | Atkinson et al. | 705/37 |
| 2001/0037278 | A1* | 11/2001 | Messmer et al. | 705/37 |
| 2002/0169658 | A1* | 11/2002 | Adler | 705/10 |
| 2003/0078850 | A1* | 4/2003 | Hartman et al. | 705/26 |
| 2004/0133504 | A1* | 7/2004 | Dalal | 705/37 |

OTHER PUBLICATIONS

"The E-Shopper". Flaim, Denise. Newsday. Sep. 19, 2001. [recovered from Proquest database on Apr. 12, 2007].*
"Sothebys.com Offers 'Buy Now' Feature". PR Newswire. May 14, 2001. [recovered from Proquest database on Mar. 12, 2007].*
"Optimal bidding strategies for competetive generators and large consumers". Wen, Fushuan. David, A.K. Electrical Power and Energy Systems. Apr. 14, 2000. [recovered from Google Scholar on Mar. 12, 2007].*
"Solution Properties of Deterministic Auctions". Barr, James. Shaftel, Timothy. The Journal of Financial and Quantatative Analysis. Jun. 1976. [recovered from Google Search on Apr. 12, 2007].*
Accelerating Information Revelation in Ascending-Bid Auctions—Avoiding Last Minute Bidding—. Shigeo Matsubara. Oct. 2001. NTT Communication Science Laboratories, NTT Corporation. [recovered from Dialog database on Apr. 30, 2008].*
R and D, Pareto Optimality and Auction Design (Research and Development). Ding, Yu Jia Michael 1988. Corporate Source/Institution: Indiana University ( 0093 ). vol. 4910A of Dissertations Abstracts International. p. 3120 . 126 pages [recovered from Dialog Database on Apr. 30, 2008].*
Game theory and empirical economics: The case of auction data. Jean-Jacques Laffont. European Economic Review 1997. [recovered from Dialog Database on Apr. 30, 2008].*
Ehtamo, H., et al., "Generating Pareto Solutions in a Two-Party Setting: Constraint Proposal Methods", Nov. 1997, (located at: http://www.bus.utexas.edu/dyerj/DA.WP/.

* cited by examiner

Primary Examiner—Jeffrey A. Smith
Assistant Examiner—William J. Allen
(74) Attorney, Agent, or Firm—Stephen C. Kaufman, Esq.; McGinn IP Law Group, PLLC

(57) ABSTRACT

A method and structure for performing a negotiation on a computer network, including initiating an auction and determining whether a Pareto-Optimal point is satisfied for the auction.

15 Claims, 11 Drawing Sheets

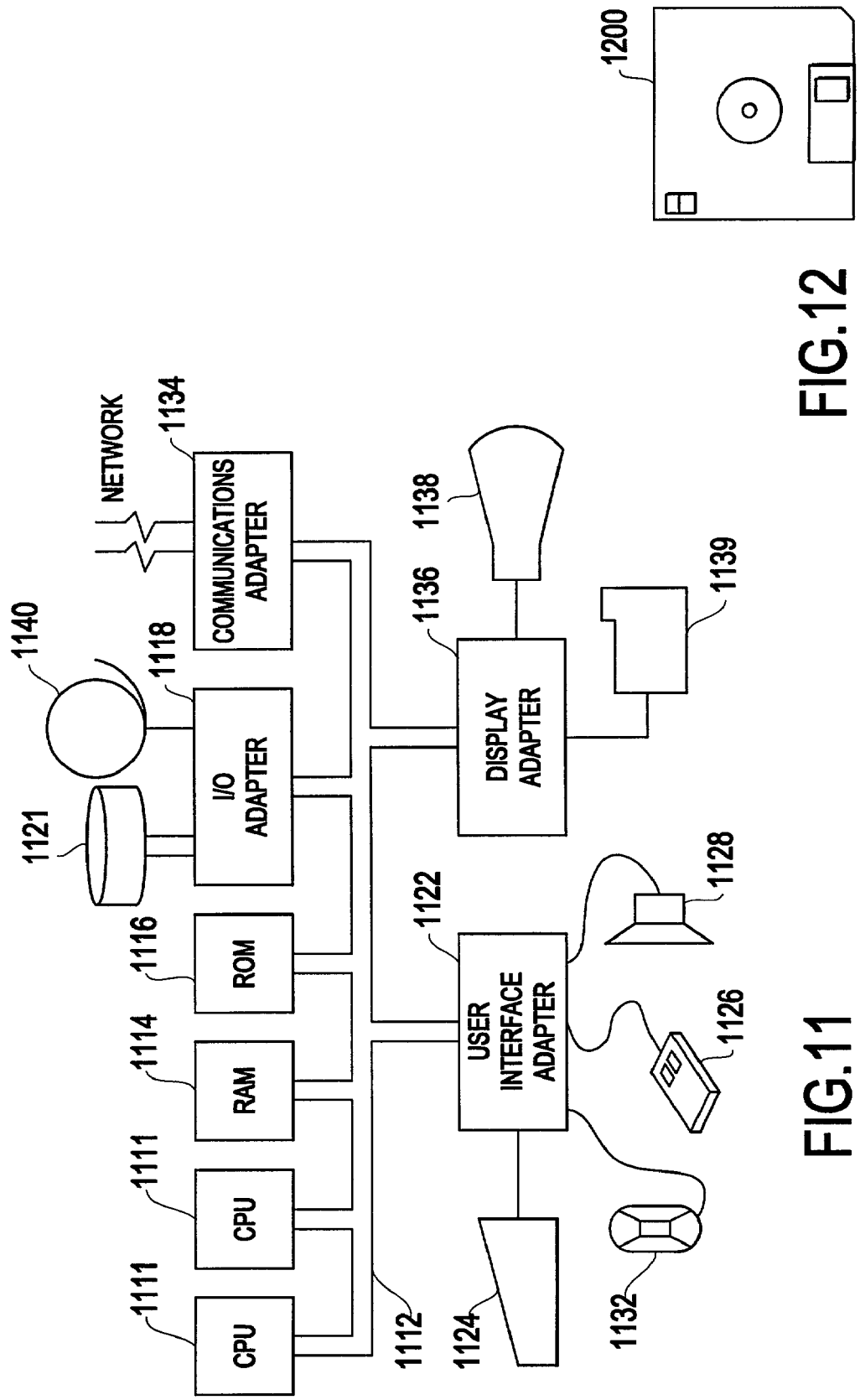

METHOD, COMPUTER NETWORK, AND SIGNAL-BEARING MEDIUM FOR PERFORMING A NEGOTIATION UTILIZING PARETO-OPTIMIZATION

BACKGROUND OF THE INVENTION

1. Field of the Invention

The present invention is generally related to a computerized negotiation process. Specifically, a software module assists the negotiation process by processing, summarizing, and presenting requests and offers and making recommendations based on having evaluated goals/objectives of the participants and a history of the present and/or past negotiations. Goals, objectives, and strategies are based upon public attributes which are known to all parties in the negotiation, as well as private attributes known only to the party entering that party's respective private attributes.

2. Description of the Related Art

Consider the following reverse auction scenario having one buyer and many sellers. The buyer initiates a Request For Quote (RFQ) that contains the requirements and the specifications for each commodity and specific quantity. A commodity in the context of the present invention means any product, good, or service sought by a buyer. Each commodity has a list of attributes also called "product attributes". An attribute can have a continuous value such as "4.5", "876", etc., or can have discrete values such as "large", "red", etc.

The RFQ includes a list of attributes and a list of commodities. Each seller can bid on one or more commodities. The quantity offered by each seller for each item might be less than the required amount. Once all the bids have been received, the buyer will evaluate them based on specific criteria and can use different strategies and policies to negotiate with each seller. The negotiation will continue until one or more parties decides to stop, with or without having reached a contract. The present invention will make a negotiation more efficient by helping a buyer and a seller to make critical decisions at each negotiation phase as well as recommending compromises among the several parties.

A decision maker can handle manually a simple Request For Quote (RFQ) with a limited number of suppliers. However, as soon as the complexity of constraints increases and the number of suppliers grows exponentially, the economic and strategic factors become part of the negotiation process, and decision making will take longer or run into problems. Fierce competition in the future will require that the time, cost, and risk in decision-making be reduced. To overcome these limitations, decision makers need a framework that can optimize the decision complexity and cover specific company strategies, as well as to satisfy constraint requirements.

Disadvantages of current negotiation techniques include the cost in money and time for failed negotiations, a possible tendency to compromise quickly, and a possible tendency to prematurely drop parties in the negotiation. Further, prior to the present invention, there has been no known system to address these issues. Negotiations would profit by an automation of the negotiation process, an automated system in which a prediction of the next move can be made, the possibility of negotiation failure is decreased, the time to reach an agreement is speeded up, and the cost of negotiation is reduced.

SUMMARY OF THE INVENTION

In view of the foregoing problems, drawbacks, and disadvantages of the conventional systems, it is an object of the present invention to provide a structure (and method) for making negotiations more efficient.

It is also an object of the present invention to provide a forum in which a buyer can negotiate with one or more sellers for one or more commodities.

It is also an object of the present invention to provide a method in which specific commodities can be tracked over time to develop a history of activities for these commodities, thereby allowing both a buyer and a seller to be aware of information concerning market conditions for each commodity.

It is also an object of the present invention to provide a method that calculates potential risks and losses for parties to a negotiation for a commodity.

It is also an object of the present invention to provide a method in which possible negotiations results are projected.

It is also an object of the invention to provide a method in which suggestions are made to both parties in a negotiation as to a future offer or counteroffer.

It is also an object of the present invention to provide a method that can be easily modified for any type of negotiation.

It is also an object of the present invention to provide a computerized negotiation tool that automates the negotiation process, predicts next moves, aids in the prevention of negotiation failure, speeds up the agreement time frame, and reduces the negotiation cost.

It is also an object of the present invention to provide a negotiation tool that helps prevent parties from compromising too quickly and from prematurely dropping parties in a negotiation.

To achieve the above objects and goals, the inventive system described herein introduces a new business model which changes the current negotiation process. As a result, the electronic(e)-marketplace will benefit by acquiring useful information rapidly from the marketplace and making the right decisions. Consequently, decisions can be made based on several factors and any decision not satisfying certain critical constraints is eliminated before it entails damaging consequences.

The present invention provides a framework that can include strategies and complex requirements in addition to optimizing the decision process. The invention helps both buyer and seller make critical decisions at each negotiation phase, as well as recommending compromises among the several parties. Each decision maker solves his own multiple criteria decision making problems. A neutral mediator identifies possible alternative solutions along the way.

In a first aspect of the present invention, described herein is a method of performing a negotiation on a computer network, including initiating an auction and determining whether a Pareto-Optimal point is satisfied for the auction.

According to a second aspect of the present invention, described herein is computer network programmed to execute steps in a negotiation, including initiating an auction and determining whether a Pareto-Optimal point is satisfied for the auction.

According to a third aspect of the present invention, described herein is a signal-bearing medium tangibly embodying a program of machine-readable instructions executable by a digital processing apparatus to assist in the performance of a negotiation, the instructions including initiating an auction and for determining whether a Pareto-Optimal point is satisfied for the auction.

The present invention reduces cost in money and time for negotiations, assists in preventing a tendency to compromise too quickly and to prematurely drop parties in the negotiation.

Negotiations profit by the automation of the negotiation process as achieved in the present invention, an automated system in which a prediction of the next move can be made.

BRIEF DESCRIPTION OF THE DRAWINGS

The foregoing and other objects, aspects, and advantages will be better understood from the following detailed description of a preferred embodiment of the invention with reference to the drawings, in which:

FIG. 11 illustrates an exemplary hardware/information handling system 1100 for incorporating the present invention therein; and FIG. 12 illustrates a signal bearing medium 1200 (e.g., storage medium) for storing steps of a program of a method according to the present invention.

DETAILED DESCRIPTION OF PREFERRED EMBODIMENTS OF THE INVENTION

Figure 1:
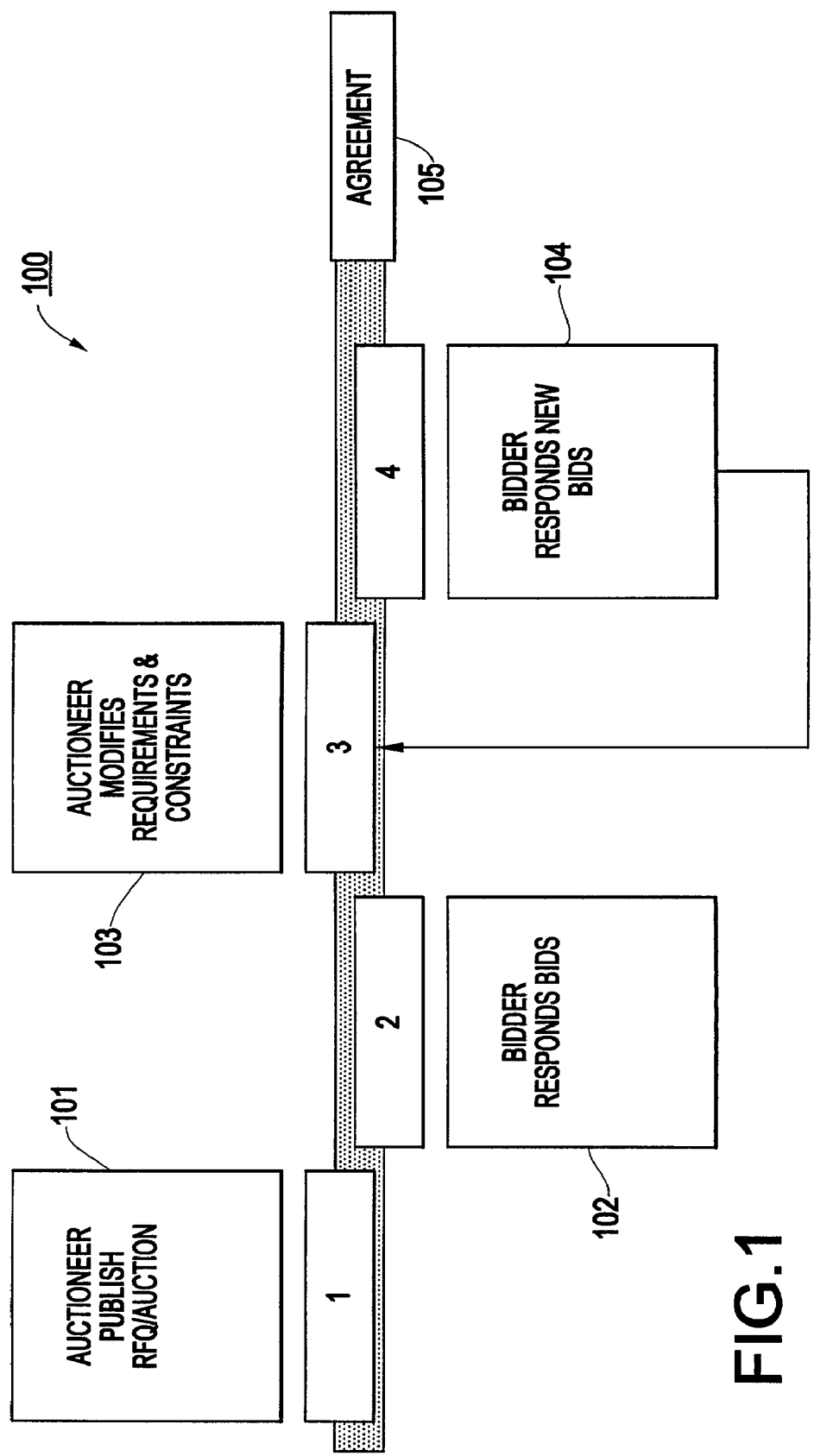
FIG. 1 is a general workflow diagram of the concept of a preferred embodiment of the invention.

Referring now to the drawings, an exemplary embodiment of the present invention will now be described. First, it is noted that the following discussion focuses on the reverse auction (e.g., a so-called "Dutch Auction") scenario in which a buyer is attempting to negotiate with multiple sellers for a commodity. However, the inventive method is not limited to this type negotiation. Instead, the techniques are more generic and could also cover, for example, scenarios involving one buyer with one seller, multiple buyers with multiple sellers, or multiple buyers with a single seller. A person of ordinary skill in the art would be able to easily adapt the discussion below to accommodate any generic or specific negotiation scenario.

FIG. 1 shows the basic workflow concept 100 of a preferred embodiment of the present invention. In a first step 101, one party, hereinafter referred to as the "auctioneer", publishes a Request For Quote (RFQ) to thereby initiate an auction. In a second step 102, one or more bidders responds with bids for the RFQ.

In a third step 103, the auctioneer evaluates the bids and modifies his requirements and constraints based on the received bid and the results of the mathematical tools to be described later and then publishes again his modified request.

In a fourth step 104, the bidder(s) likewise evaluates the modified request and makes modifications based on results of these tools. The third and fourth steps 103, 104 may be repeated a number of cycles until agreement is reached in step 105. By the same token, the number of cycles for steps 103 and 104 might be predetermined by the auctioneer when he first initiates the auction. Alternatively, it could merely be continued until agreement is reached. Either party could drop out at any stage prior to agreement 105, thereby terminating their involvement in the auction.

Figure 2:
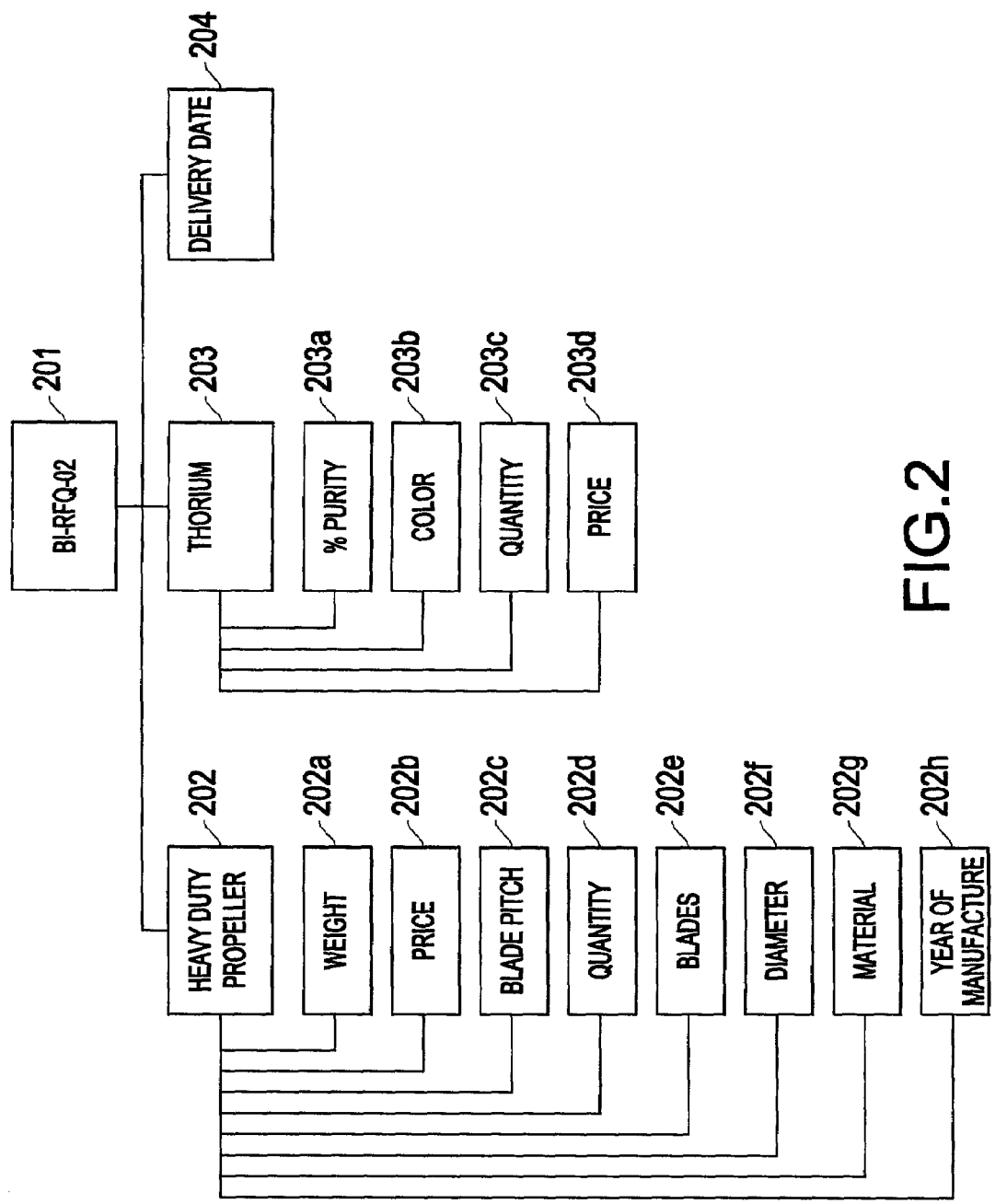
FIG. 2 shows a representative example of a request for quote (RFQ)

FIG. 2 shows a simple auction example, in which a buyer wishes to initiate an RFQ 201 for a certain number of heavy duty propellers 202 and for a certain quantity 203 of thorium to be delivered by a predetermined date 204. Each product will have its unique set of attributes, such as weight 202*a*, quantity 202*d*, diameter 202*f*, number of blades 202*e* for the propeller 202 and percent purity 203*a*, color 203*b*, and quantity 203*c* for the thorium. Of these attributes, some will be "public attributes", meaning that all parties involved in the negotiation will have to know them in order for the negotiation to occur. Public attributes for the propeller might be weight, pitch, quantity, number of blades, diameter, material, and possibly year of manufacture. Public attributes for the thorium might be percent purity, color, and quantity.

In contrast, "private attributes" are those that are known only to the party entering this data into the system. For example, the buyer (auctioneer) might enter a price range involving a range of prices from a preferred low value to maximum high value. This price range would not be known to bidders and would, therefore, be a private attribute.

The bidder(s) may also have private attributes associated with each auction. For example, each bidder might have a range of prices depending on volume, delivery date, material, etc. Year of manufacture might be a private attribute. The amount in inventory or availability dates might also be private attributes.

Figure 3:
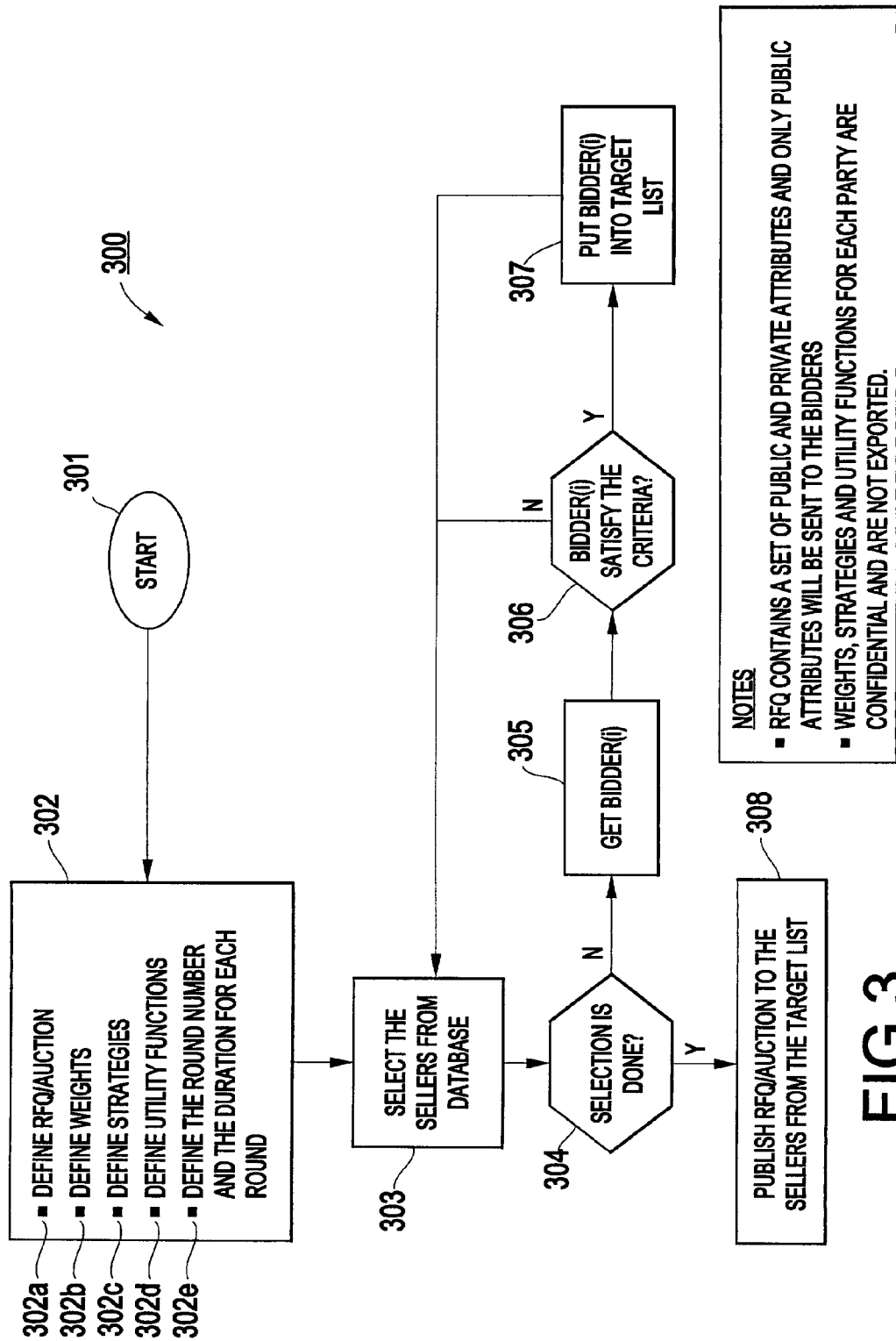
FIG. 3 shows an exemplary flowchart of the auctioneer initiating an auction.

FIG. 3 shows an exemplary embodiment 300 of the first step in which a buyer wishes to initiate an auction. After having invoked the program in step 301, the auctioneer enters, in step 302, a series of data that will define the auction by defining (302*a*) the products or services to be secured and the number of rounds and duration of each rounds (302*e*). These parameters will typically be public attributes. In a preferred exemplary embodiment, some of these public attributes such as products or services desired would be selected from a library of options, but there is no reason to thusly confine the invention.

The weights, strategies, and utility functions (302*b*-302*e*) defined for attributes would typically be private attributes, known only to the party entering the data (here the auctioneer) although this private data will be used by the mathematical tools used to evaluate the negotiation process as it proceeds.

In this framework, there are various mathematical calculations invoked. For example, a mathematical evaluation solves two types of utility functions, a local utility function for evaluating attributes and commodities, and a global utility function for determining the final result based on the local computations. A constraint solver converts all the requirements into logical constraints and notifies the party of any constraint violations. For example, the attribute 'Color' has a 'direct assignment' utility function for computing the score of the colors, and a logical constraint function that verifies the match of the colors and the requirements. A statistical analysis module computes and maintains a record of the evolution of the negotiation process and, as negotiation proceeds, suggests the next move to provide guidance to an agreement direction.

In steps 303-307, the auctioneer consults a database to select sellers (bidders) to compose a target list. Upon completion, the RFQ/auction is published to the target list (step 308). In steps 305-306, the auctioneer has the option of reviewing the potential bidder with possibly preliminarily eliminating that bidder if the bidder information in the database suggests to the auctioneer that the bidder is somehow unsatisfactory. For example, the auctioneer might not wish to conduct business with a company listed as using child labor. Other examples might include geographical location, past negative experience with the potential bidder, or even simple personal preference. The target list selection step could be entirely manually entered by the auctioneer. Alternatively, it might involve automatic screening based on one or more criterion entered by the auctioneer.

Figure 4:
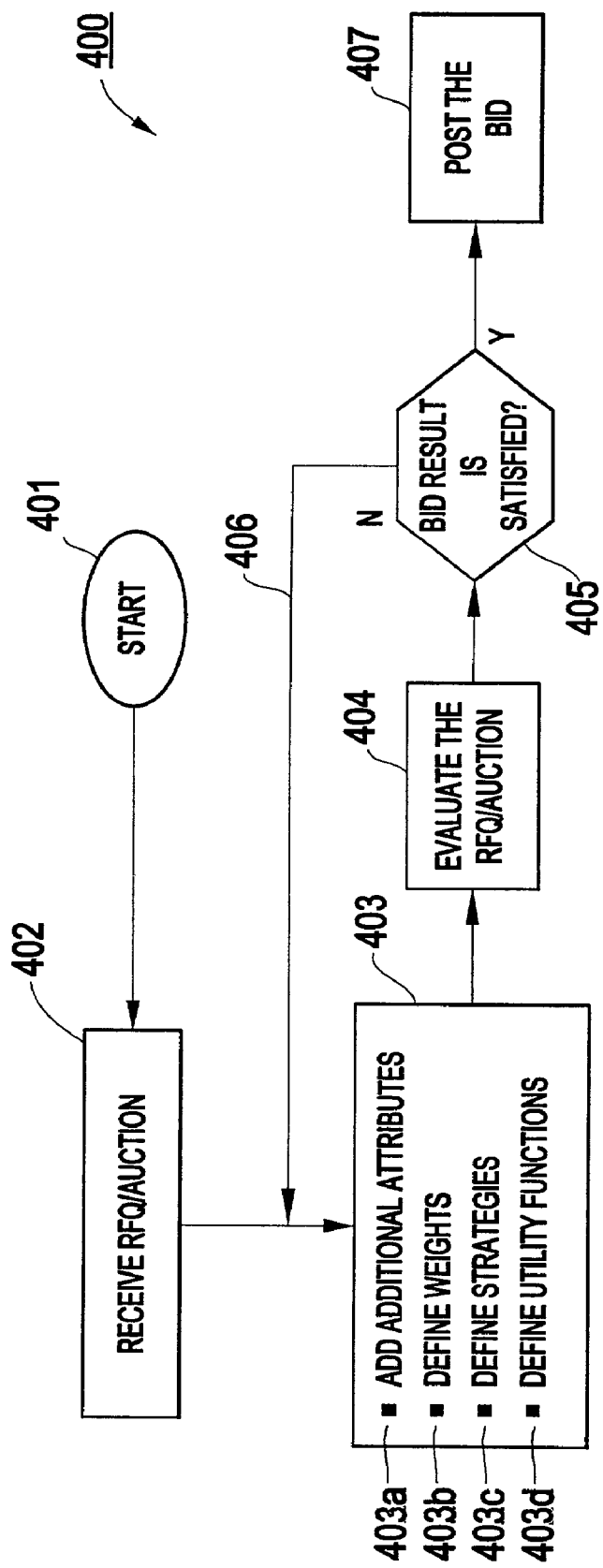
FIG. 4 shows an exemplary flowchart of a bidder's responses upon having received the RFQ/Auction.

FIG. 4 shows an exemplary embodiment 400 of the second step 102 shown in FIG. 1, in which one or more bidders responds to the recently published RFQ/Auction. Upon invoking the system in step 401, the bidder receives the RFQ/Auction and enters his attributes (403a) as well as negotiation weights, strategy, and utility function (403b-403d). The utility function is a mathematical function applied to one or many attributes and returns a value after the computation of the formula, based on negotiation weights previously entered by the party, thereby providing a simple quantitative indication as to how the various attributes and weights are satisfied.

Typically, this data entry would include entirely private attributes, but there might be specific examples where some of the additional attributes (403a) would be public attributes or, possibly, modifications or proposed modifications of public attributes already entered by the auctioneer. Based on the data entered by the bidder, the system evaluates the RFQ/Auction in step 404 using the weights, strategies, and utility function entered and in step 405 determines whether the bid result is satisfied. If not, the bidder can modify entries in step 406 until the result is satisfactory and the bid gets posted on-line in step 407.

Figure 5:
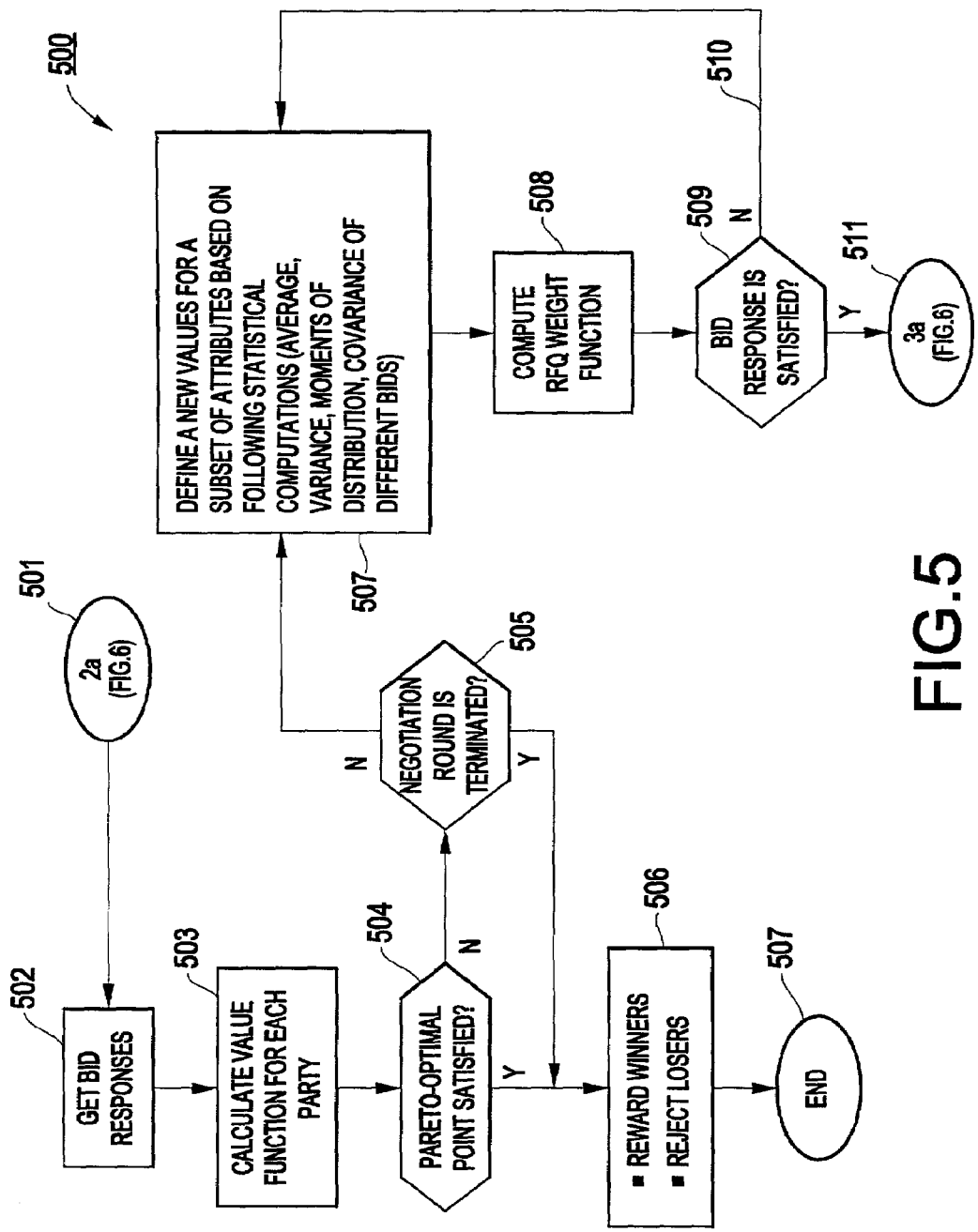
FIGS. 5 and 6 show an exemplary flowchart of the auctioneer's response upon receipt of the bids in a round of negotiation, including a Pareto-optimal point calculation.
Figure 6:
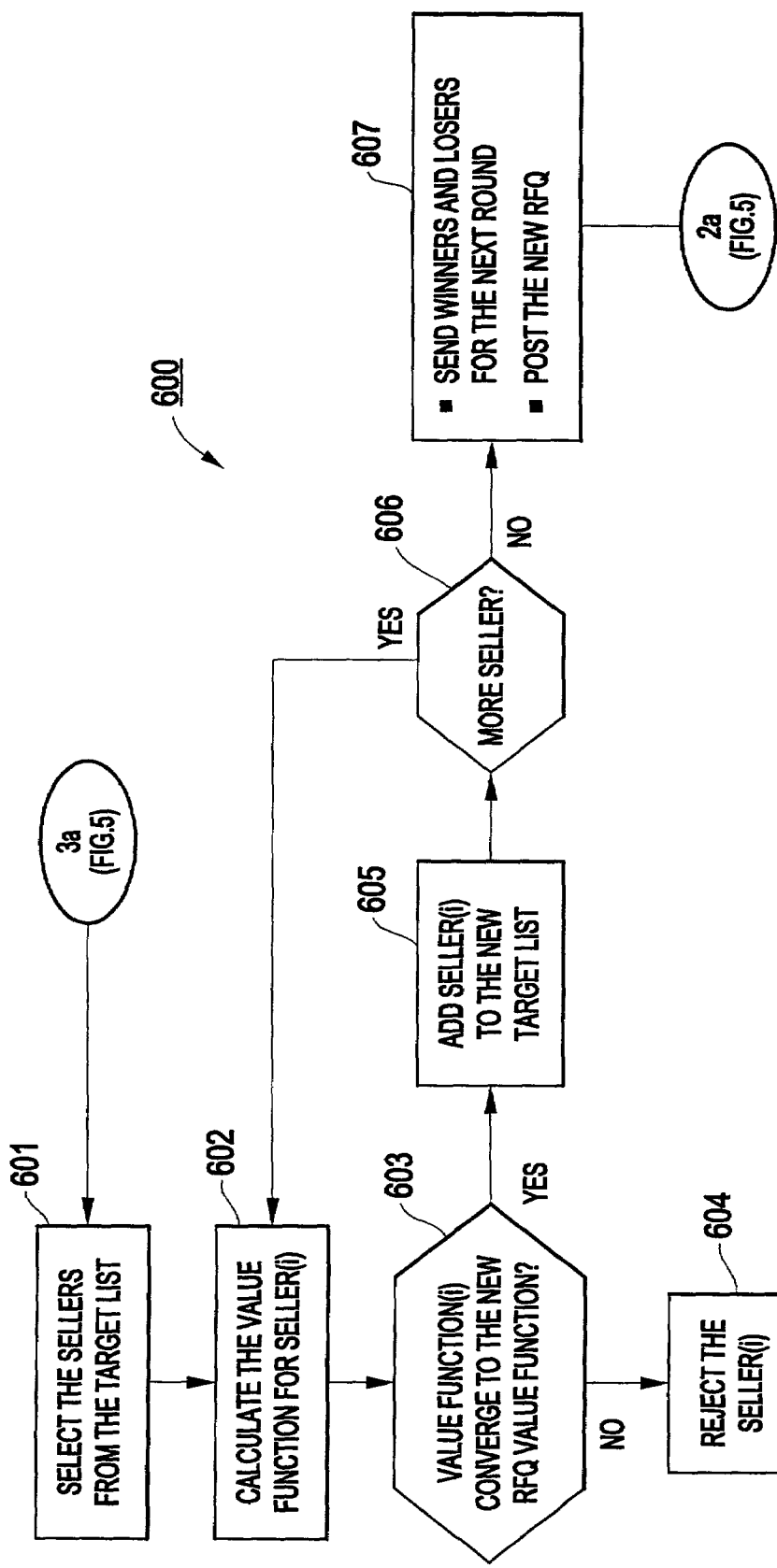

FIGS. 5 and 6 show an exemplary embodiment 500 of the third step 103 shown in FIG. 1, in which the auctioneer receives back the bids and proceeds to evaluate them. The process illustrated by the FIG. 5 flowchart develops the set of sellers that are providing bids closest to the Pareto-Optimal point to proceed to the next round of negotiation and identify those sellers moving closer to this point. Bid responses are retrieved in step 502. The mathematical tools described below calculates the value function for each party, the auctioneer and each bidder, in step 503 based on the public and private attributes to determine in step 504 if the Pareto-Optimal point satisfied. If the Pareto-Optimal point is satisfied, the program announces the winner(s) and loser(s) in step 506 and thereafter terminates in step 507.

Pareto-optimality is a widely accepted criterion of economic efficiency. A state of a given system is Pareto-optimal, and thus efficient, if and only if there is no feasible alternative state of that system in which at least one person is better off and no one is worse off. And, for purposes of this criterion, a person is 'better off' with some alternative A rather than B if and only if this person prefers A to B. The Pareto-Optimal approach used in this framework consists of finding a space that captures the convergence of all parties.

To reach an agreement, each party should move to the center of this space. Calculation of the Pareto solution can be done using various algorithms, and details of any specific method is not discussed herein. For example, an article available on the Internet at the University of Texas website (reference the website at: .bus.utexas.Edu/~dyerj/DA_WP/, having reference number WP980012), "Generating Pareto Solutions in a Two-Party Setting: Constraint Proposal Methods", by Harri Ehtamo et al., presents a class of methods, called constraint proposal methods, for generating Pareto-optimal solutions in two-party negotiations. Another method is discussed in "Decentralized Method for Computing Pareto Solutions in Multi-Party Negotiations", European Journal of Operational Research, Volume 117, No. 3, 1999, at pages 578-590.

If the Pareto-Optimal point is not satisfied, the program in step 505 determines whether the number of rounds preselected by the auctioneer has occurred and, if so, proceeds to step 506 to announce winner(s) and loser(s). If one or more rounds remain, the program then in step 507 invokes the mediator algorithm module further described below in FIGS. 9 and 10 to calculate new values based on statistical analysis of historical data and then calculates a new RFQ weight function (step 508) to determine in step 509 whether the bid response is satisfied. Either the auctioneer or any of the bidders can perform appropriate calculations based on information updated in the latest round. The bidder can also have a set of private attributes and utility functions. In step 506 the auctioneer can select who goes to the next round based on the ranking list.

The list of surviving sellers (bidders) 601 in the new round is dealt with in the process 600 shown in FIG. 6. These surviving bidders are evaluated and rejected in steps 602-606, based on whether their respective value function converges to the new RFQ value function. The new list of bidders and new RFQ are posted in step 607 for the next round, as described by being the input step 501 into FIG. 5.

Figure 7:
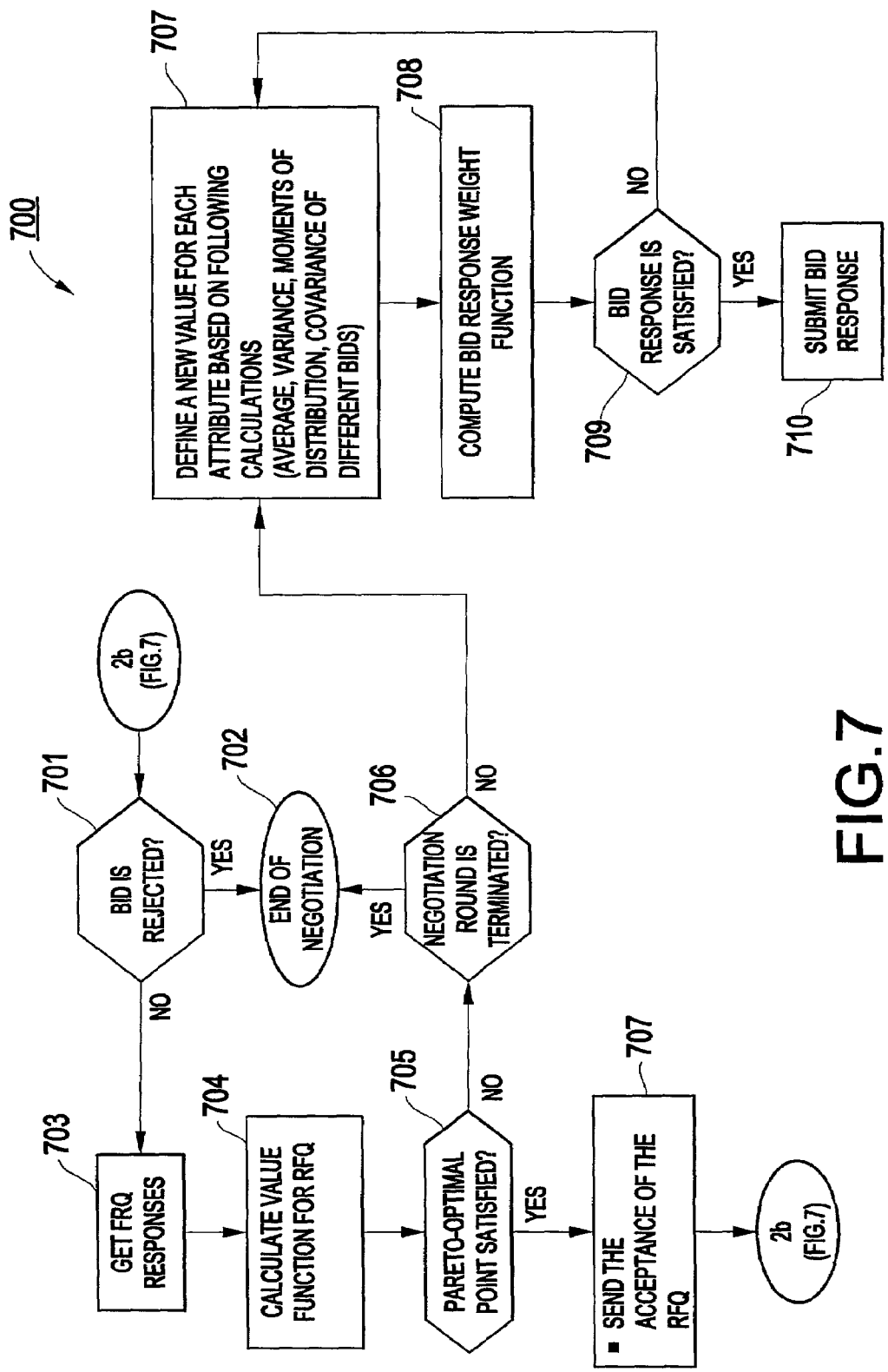
FIG. 7 shows an exemplary flowchart of the bidder's response upon receipt of receiving a new posted RFQ by the auctioneer, including a Pareto-optimal point calculation.

FIG. 7 shows an exemplary embodiment of the steps 700 for a bidder's response upon receiving the auctioneer's acceptance/rejection of a bid previously submitted. In step 701 the bidder determines if the auctioneer has rejected the bid. If so, this bidder's negotiation in the auction is terminated in step 702. Else, in step 703 the RFQ response from the auctioneer is retrieved in order to calculate the bidder's value function in step 704 to determine in step 707 if the Pareto-Optimal point is satisfied. If so, the bidder sends an acceptance of the RFQ in step 707. If the Paretal-Optimal point is not satisfied, the program determines in step 706 whether to end the bidder's negotiation (step 702) because the round is terminated or to continue into step 707 where the mathematical tool will develop statistical parameters of the negotiation to allow a refinement of the bidder's bid (steps 708-710).

Figure 8:
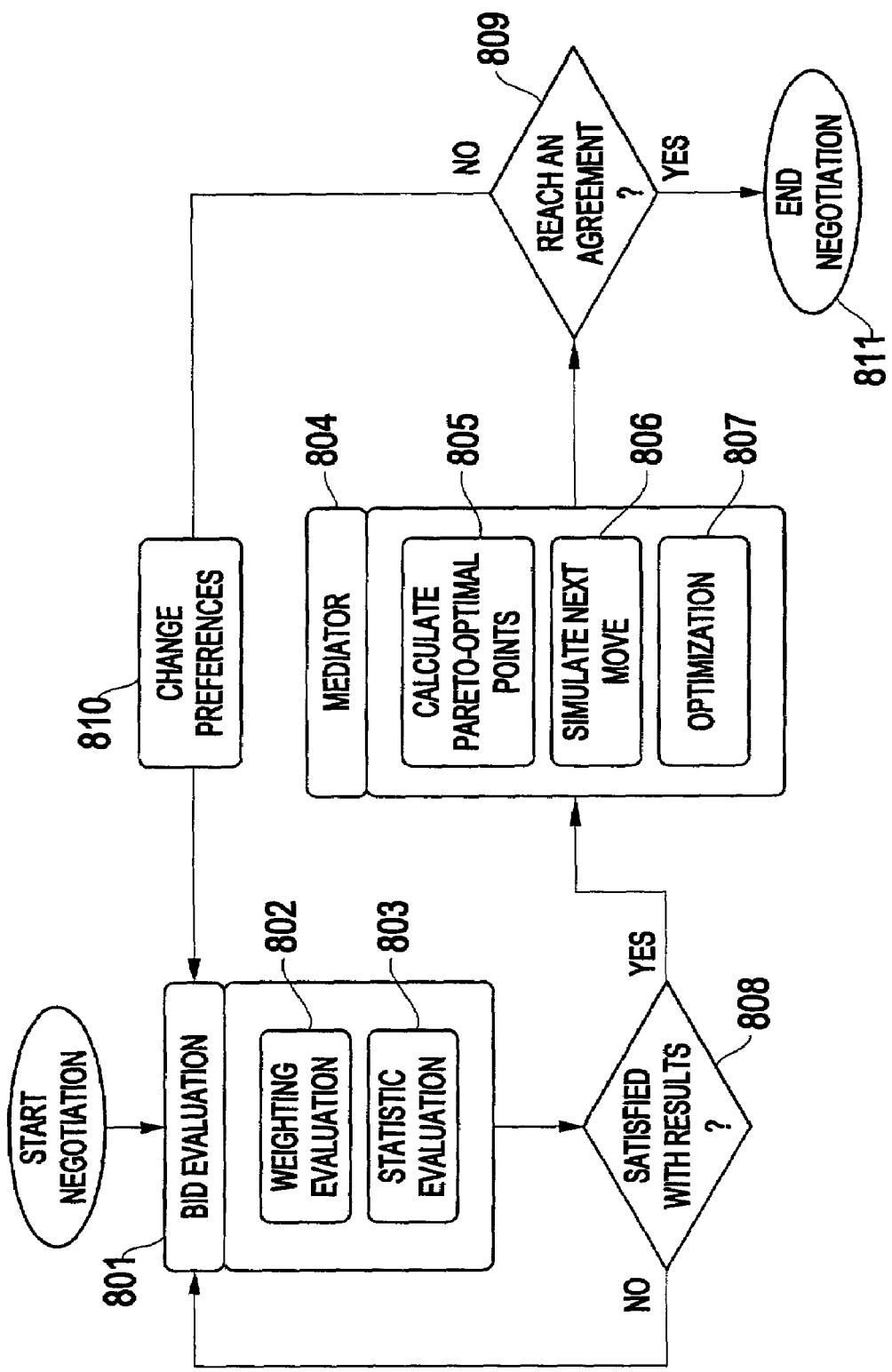
FIG. 8 shows an exemplary algorithm workflow of the mathematical tools used in the invention.
Figure 9:
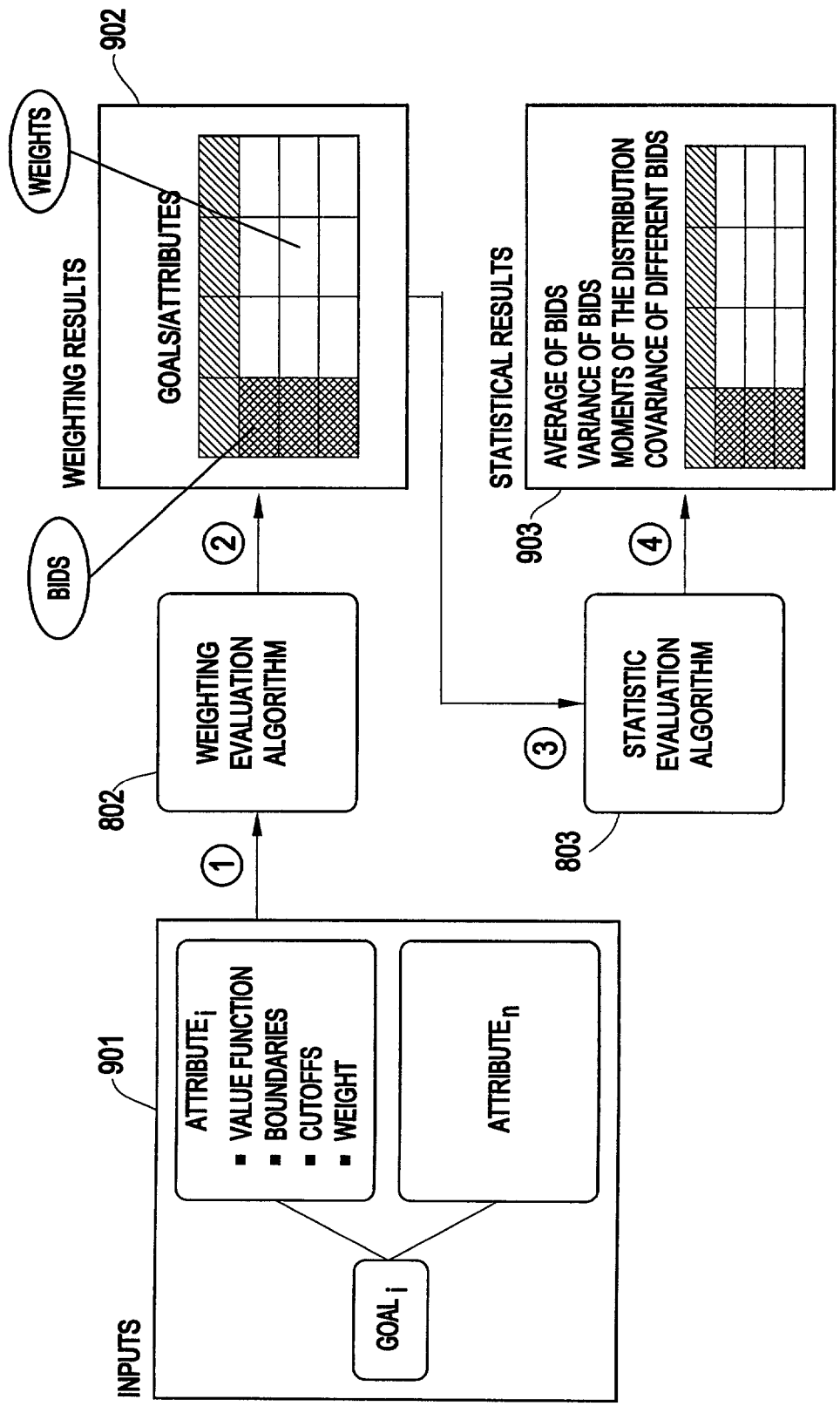
FIG. 9 shows exemplary workflow of an analysis of a bid.
Figure 10:
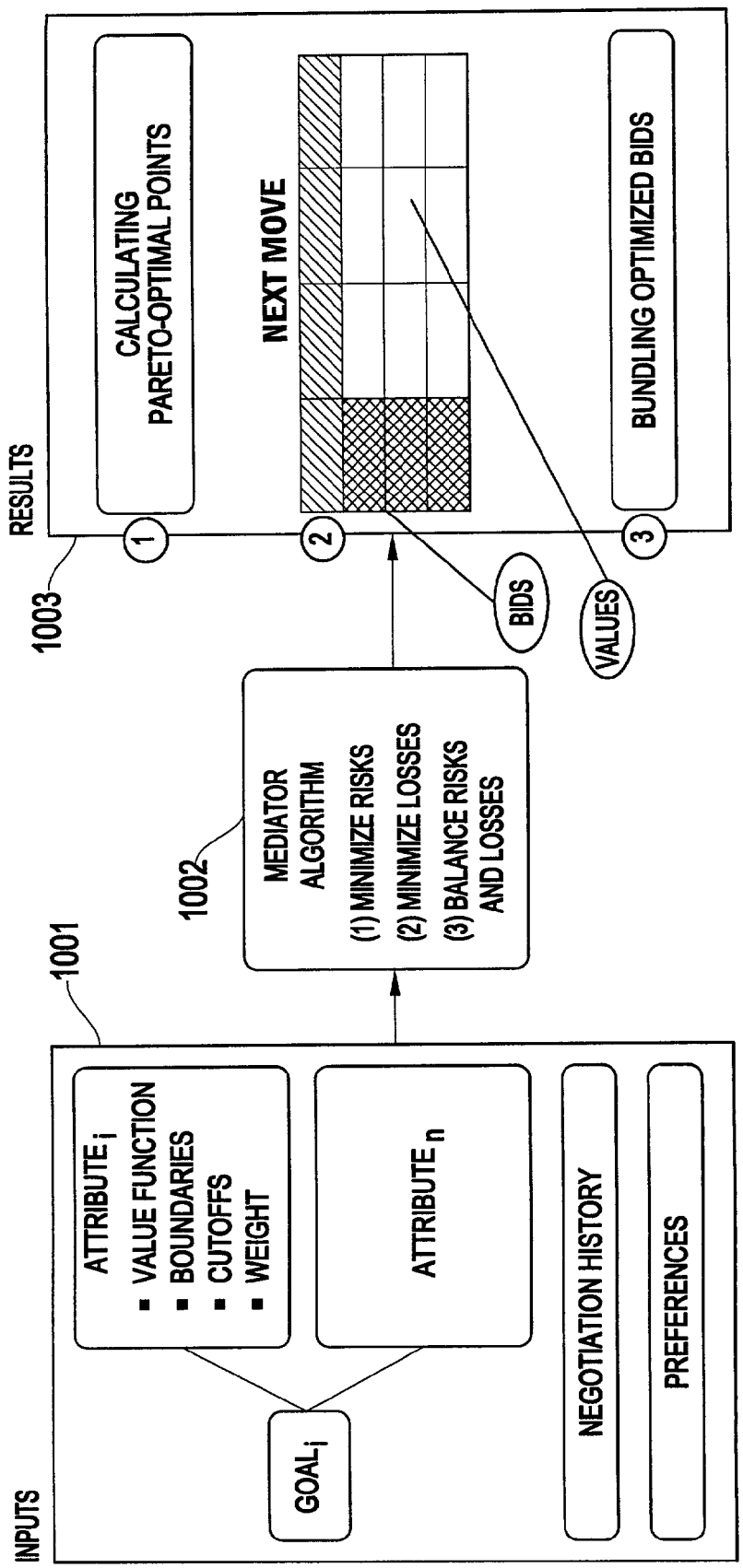
FIG. 10 shows an exemplary workflow of the mediator algorithm used in the invention.

FIGS. 8 through 10 explain in more detail how the mathematical algorithms used in the exemplary embodiment of the invention could be implemented in software modules. In the context of the reverse auction for Request For Quote (RFQ), the present invention allows each decision maker DM to solve his own multiple criteria decision making problems while a neutral mediator identifies alternative solutions. For purpose of discussing the exemplary implementation there are n sellers assumed and each seller provides several commodities, each of which has a set of (m) attributes. The following notation is used.

Decision Variables: These are the issues under negotiation. Given n decision variables, then $w_i$ is the weight assigned to variable i and $r_i$ is the corresponding risk factor. The weights (or preferences) and risk factors are not shared.

Matrix $A(t)=(a_{ij})(t)|_{n \times m}$, where the matrix $$\begin{vmatrix} a_{11}(t) & a_{12}(t) & \ldots & a_{1j}(t) & \ldots & a_{1m}(t) \\ a_{21}(t) & a_{22}(t) & \ldots & a_{2j}(t) & \ldots & a_{2m}(t) \\ \vdots & \vdots & \ldots & \vdots & \ldots & \vdots \\ a_{i1}(t) & a_{i2}(t) & \ldots & a_{ij}(t) & \ldots & a_{im}(t) \\ \vdots & \vdots & \ldots & \vdots & \ldots & \vdots \\ a_{n1}(t) & a_{n2}(t) & \ldots & a_{nj}(t) & \ldots & a_{nm}(t) \end{vmatrix}$$

represents the bids from n sellers on m attributes at any time t=0, 1, 2, ...

Matrix $Q=((q_{ij})_{l\times m})$, with $q_{ij}$ representing the quantities needed for each commodity j from buyer i.

Matrix $O=((o_{ij})_{m\times s})$, with $o_{ij}$ being the quantity needed in response to seller i's bid on commodity j.

$f_{kl}(t)$, the distribution of attribute i from seller k up to time t with mean $u_{kl}(t)$ and variance $v_{kl}(t)$.

$m_k(t)$, the average of bid from seller k at time t upon all attributes with weight $w_i$.

Matrix $S=((s_{ij})_{n\times m})$ for strategies where $s_{ij}$ is the strategy i applied to attribute j. Value functions $f_i=f(s_{il}, s_{im})$ is the global strategy. At each negotiation phase, the decision maker chooses an appropriate strategy to evaluate the decision variables.

Based on this notation framework, FIGS. 8-10 present a multiple objective optimization algorithm for multiparty negotiation over continuous issues which consists of the following major parts.

In FIG. 8 the Bid Evaluation Algorithm 801 takes into consideration all the inputs described above. This algorithm will produce optimal bundlings (see FIG. 10) as well as analysis of risks and loss values. The decision makers are able to choose their preferred bundlings from a set of alternatives. Weighting Evaluation module 802 calculates the value function of each attribute. The boundaries are used as cutoff levels, i.e., any value that is out of the boundaries will be violated. Module 802 could also calculate a value function of each goal/objective;

The Statistical Evaluation module 803 uses defined mathematical operations to calculate various statistics related to the negotiation, such as average of bids on each attribute, variance of bids on each attribute, moments of the distribution of each attribute, and covariance of different bids as well as different sellers.

Mediator module 804 contains several algorithms. For example, the Pareto-optimal points are calculated 805, using any of commercially available software modules and typically involving the utility function of all parties. Use of the Pareto-optimal points allows each party to minimize the chance that party will be unwittingly eliminated from the negotiation. Simulator module 806 will take the negotiation history record to generate preferred proposals for agreements. Based on this algorithms and the preference of each individual, different goals can be analyzed: minimizing risks, minimizing losses, balancing risks and losses, maximizing profit, minimize the risk of elimination from the negotiation, maximize the chance of being included in the negotiation, and so on.

In a preferred embodiment, a Monte Carlo process is used for this simulation along with a recalculation of the Pareto-optimal points. The Monte Carlo simulation method might calculate the distribution of each seller from different sellers and simulate the next move of each player. The simulator might also calculate a risk evaluation of each move and a loss valuation of each move.

The Optimization module 807 attempts to minimize risks and losses and maximize the probability of reaching agreement. It would consider both the local optimization for each commodity as well as the global optimization for bids with possible bundlings.

All surviving parties would determine their satisfaction with the current result in steps 808 and 809 to appropriately arrive at the end of the negotiation in step 811.

FIG. 9 demonstrates how the mathematical software modules could be structured for the necessary tasks of receiving inputs 901, making calculations 802, 803, and storing results 902, 903.

FIG. 10 provides another structural view of the software modules including input module 1001, mediator algorithm module 1002, and results module 1003 to display results to the respective parties. Details of these modules should be apparent to a person of ordinary skill after having read the above description.

FIG. 11 illustrates a typical hardware configuration of an information handling/computer system in accordance with the invention and which preferably has at least one processor or central processing unit (CPU) 1111.

The CPUs 1111 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above. Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1111 and hardware above, to perform the method of the invention.

This signal-bearing media may include, for example, a RAM contained within the CPU 1111, as represented by the fast-access storage for example. Alternatively, the instructions may be contained in another signal-bearing media, such as a magnetic data storage diskette 1200 (FIG. 12), directly or indirectly accessible by the CPU 1111.

Whether contained in the diskette 1200, the computer/CPU 1111, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

The present invention can be modified to apply in almost any type of negotiation process. Disadvantages of current negotiation techniques include the cost in money and time for failed negotiations, a possible tendency to compromise quickly, and a possible tendency to prematurely drop parties in the negotiation. Major benefits provided by the present invention are the automation of the negotiation process, prediction of the next move, prevention of an agreement failure, speeding the agreement time frame, and reducing the negotiation cost.

While the invention has been described in terms of preferred embodiments, those skilled in the art will recognize that the invention can be practiced with modification within the spirit and scope of the appended claims.

What is claimed is:

1. A method of performing a negotiation on a computer network, said method comprising:

initiating an auction, wherein said auction comprises at least one auctioneer and at least one bidder, said at least one auctioneer entering a Request For Quote (RFQ) to initiate said auction, said RFQ comprising a listing of at least one commodity, each said commodity associated with a listing of at least one public attribute;

each of said at least one bidder responding to said RFQ;

calculating a Pareto-Optimal point for said auction and determining whether said Pareto-Optimal point is satisfied for said auction;

in response to determining that said Pareto-Optimal point for said auction is not satisfied, retaining those participants of said negotiation who are closest to said Pareto-Optimal point for a subsequent round of said negotiation; and identifying those participants that are moving closer to said Pareto-Optimal point; and in response to determining that said Pareto-Optimal point has been satisfied, terminating said negotiation and announcing a result of said negotiation.

2. The method of claim 1, further comprising:

maintaining a record of said negotiation as it proceeds, said record used to provide data for calculations for at least one of the following:

simulation of a next step in said negotiation;

development of a suggested next step in said negotiation;

prediction of a response in a next step of said negotiation; and development of a database for future negotiations.

3. The method of claim 1, further comprising:

simulating a next move for at least one party involved in said auction, based on historical data; and providing an analysis of risks of a next step for at least one party based on said simulation.

4. The method of claim 1, further comprising:

calculating a value function for at least one party in said auction, wherein said value function is based on a weighting factor for each of said at least one attribute.

5. The method of claim 1, further comprising at least one of the following:

providing each of said at least one auctioneer an option to additionally enter a listing of private attributes; and providing each of said at least one bidder an option to additionally enter a listing of private attributes.

6. A computer network comprising a processor and memory, said memory storing instructions for executing a negotiation procedure over said network, said negotiation procedure comprising:

initiating an auction, wherein said auction comprises at least one auctioneer and at least one bidder, said at least one auctioneer entering a Request For Quote (RFQ) to initiate said auction, said RFQ comprising a listing of at least one commodity, each said commodity associated with a listing of at least one public attribute;

each of said at least one bidder responding to said RFQ;

calculating a Pareto-Optimal point for said auction and determining whether said Pareto-Optimal point is satisfied for said auction;

in response to determining that said Pareto-Optimal point for said auction is not satisfied, retaining those participants of said negotiation who are closest to said Pareto-Optimal point for a subsequent round of said negotiation; and identifying those participants that are moving closer to said Pareto-Optimal point; and in response to determining that said Pareto-Optimal point has been satisfied, terminating said negotiation and announcing a result of said negotiation.

7. The computer network of claim 6, said procedure further comprising:

maintaining a record of said negotiation as it proceeds, said record used to provide data for calculations for at least one of the following:

simulation of a next step in said negotiation;

development of a suggested next step in said negotiation;

prediction of a response in a next step of said negotiation; and development of a database for future negotiations.

8. The computer network of claim 6, said procedure further comprising:

simulating a next move for at least one party involved in said auction.

9. The computer network of claim 6, said procedure further comprising: calculating a value function for at least one party in said auction, wherein said value function is based on a weighting factor for each of said at least one attribute.

10. The computer network of claim 6, said procedure further comprising:

at least one of the following:

providing each of said at least one auctioneer an option to additionally enter a listing of private attributes; and providing each of said at least one bidder an option to additionally enter a listing of private attributes.

11. A signal-bearing medium tangibly embodying a program of machine-readable instructions executable by a digital processing apparatus to assist in the performance of a negotiation, said instructions comprising:

initiating an auction, wherein said auction comprises at least one auctioneer and at least one bidder, said at least one auctioneer entering a Request For Quote (RFQ) to initiate said auction, said RFQ comprising a listing of at least one commodity, each said commodity associated with a listing of at least one public attribute;

each of said at least one bidder responding to said RFQ;

calculating a Pareto-Optimal point for said auction and determining whether said Pareto-Optimal point is satisfied for said auction;

in response to determining that said Pareto-Optimal point for said auction is not satisfied, retaining those participants of said negotiation who are closest to said Pareto-Optimal point for a subsequent round of said negotiation; and identifying those participants that are moving closer to said Pareto-Optimal point; and in response to determining that said Pareto-Optimal point has been satisfied, terminating said negotiation and announcing a result of said negotiation.

12. The signal-bearing medium of claim 11, said instructions further comprising:

maintaining a record of said negotiation as it proceeds, said record used to provide data for calculations for at least one of the following:
simulation of a next step in said negotiation;
development of a suggested next step in said negotiation;
prediction of a response in a next step of said negotiation; and
development of a database for future negotiations.

13. The signal-bearing medium of claim 11, said instructions further comprising:
simulating a next move for at least one party involved in said auction.

14. The signal-bearing medium of claim 11, said instructions further comprising:
calculating a value function for at least one party in said auction, wherein said value function is based on a weighting factor for each of said at least one attribute.

15. The signal-bearing medium of claim 11, said instructions further comprising at least one of the following:
providing each of said at least one auctioneer an option to additionally enter a listing of private attributes; and
providing each of said at least one bidder an option to additionally enter a listing of private attributes.

* * * * *